United States Patent [19]

Gercekci et al.

[11] Patent Number: 4,841,133

[45] Date of Patent: Jun. 20, 1989

[54] DATA CARD CIRCUITS

[75] Inventors: Anil Gercekci, Geneva; Michel Bron, Lausanne, both of Switzerland; Peter D. Hudson, Camberley, United Kingdom

[73] Assignee: Motorola, Inc., Schaumburg, Ill.

[21] Appl. No.: 175,390

[22] Filed: Mar. 30, 1988

[30] Foreign Application Priority Data

Jun. 30, 1987 [GB] United Kingdom ............... 8715268

[51] Int. Cl.$^4$ ........................................... G06K 19/06
[52] U.S. Cl. ................................. 235/492; 235/380
[58] Field of Search ............................ 235/380, 492

[56] References Cited

U.S. PATENT DOCUMENTS 3,641,499 2/1972 Housman ......................... 235/380

*Primary Examiner*—Harold I. Pitts
*Attorney, Agent, or Firm*—Michael D. Bingham

[57] ABSTRACT

An integrated circuit for a data or "smart" card includes a non-volatile memory (8) having a transport code preprogrammed therein, control circuitry (10), a comparator (24) for comprising an externally-applied code and the transport code, and a fuse (26) which is blown if the two codes match thereby allowing the card to be initialised with a personal identification number and initial credit values. A second fuse (28) may also be provided which is blown if the two codes do not match and sensing means (32, 34) sense the status of the two fuses (26, 28) and block any further attempts to initialise the card if the second fuse (28) is blown and the first fuse (26) is not.

19 Claims, 3 Drawing Sheets

TRANSPORT MODE

USER MODE

DATA CARD CIRCUITS

This invention relates to data cards of the type where an integrated circuit on a semiconductor chip is embedded in a plastic card of a size similar to that of the most frequently used credit or cheque cards. Such cards may be so-called "smart" cards which include a microprocessor and may be used for low cost debit cards for the replacement of coins in applications such as public telephones.

Such cards must be capable of providing adequate protection against misuse and fraudulent manipulation. As is known from, for example, an article entitled "Intelligent Non-Volatile Memory for Smart Cards" by Robert DeFrancesco and Hartmut Schrenk in IEEE Transactions on Consumer Electronics Vol. CE-32, No. 3, August 1986, pages 604–607, storing information as a charge in a non-volatile memory on the semiconductor chip is advantageous as it is not possible to detect charges either microscopically or chemically or to invalidate them during analysis.

The semiconductor chips used in such cards generally include a non-volatile electronic counter made up of a binary up-counter and of an Electrically Erasable PROM (EEPROM). The EEPROM is programmed with a counter value indicative of the value of services remaining or used and may, if required also include a Personal Identification Number (PIN). When a new card is first issued an initial counter value is also programmed into the EEPROM. It is however possible that cards may be stolen or otherwise fraudulently obtained before they have been initialised thus allowing the fraudster to program them with the initial counter value.

It is thus an object of the present invention to provide an increased level of security against the theft of un-initialised cards.

Accordingly, the invention provides a data card of the type comprising an integrated circuit on a semicondutor chip embedded in a plastic card, the circuit including a non-volatile memory having a transport code preprogrammed therein, control circuitry for controlling the circuit, a comparator having a first input coupled to an input node of the circuit for receiving an externally-applied code and a second input coupled to said memory for comparing said externally-applied and transport codes, and a first irreversible switch coupled to an output of the comparator such that said first irreversible switch is actuated if the externally-applied and transport codes match.

In a preferred embodiment, the data card further comprises first sensing means coupled between said control circuitry and said first swtich for sensing whether said first switch has been actuated, whereby the transport code is deleted from the memory and initialisation of the memory is enabled by the control circuitry if the first switch has been actuated and may also comprise blocking means coupled to the control circuitry for preventing the memory from being read or programmed if the first switch has not been actuated.

Initialisation of the memory, which preferably comprises an Electrically Erasable Programmable Read Only Memory (EEPROM), may include programming a personal security code and an initial counter value into the memory.

The irreversible switch preferably comprises a fuse which may be blown by applying a high current pulse thereto.

It will of course be appreciated that although such a data card has an improved level of security against theft of un-initialised cards, if such cards are illegally obtained, it may be possible to try to enter different externally-applied codes until the correct one is found. Although, depending on the length of the code, this may involve a large number of trials, it would be desirable to improve the security of the card still further in order to prevent large numbers of trials.

Accordingly, the debit card may further comprise a second irreversible switch, preferably also a fuse, coupled to an output of the comparator such that the second irreversible switch is actuated if the externally-applied and transport codes do not match.

The debit card preferably further comprises a second sensing means coupled between the control circuitry and the second switch for sensing whether the second switch has been actuated and disabling means coupled to the control circuitry for disabling the circuit if the second switch has been actuated.

In a preferred embodiment, the first and second switches are coupled in parallel to the output of the comparator such that the output of a signal from the comparator causes either the first or second switch to be actuated.

Both irreversible switches are preferably fuses having an equal sensitivity.

Clearly, a data card having irreversible switches between different modes of operation cannot be tested during manufacture by activating the switches in order to check that the circuit operates satisfactorily in the different modes since this would involve activating the switches which would then be destroyed.

Accordingly, the debit card may further comprise test means for simulating the status of an irreversible switch whereby the circuit may be tested without activating the irreversible switch.

In a preferred embodiment, the test means is enabled by a test signal to start a test and includes a third irreversible switch, preferably a fuse, which is actuated on completion of the test. The test means may comprise a logic circuit which preferably simulates the status of both the first and second irreversible switches.

This invention will now be more fully described, by way of example, with reference to the drawings of which:

Figure 1:
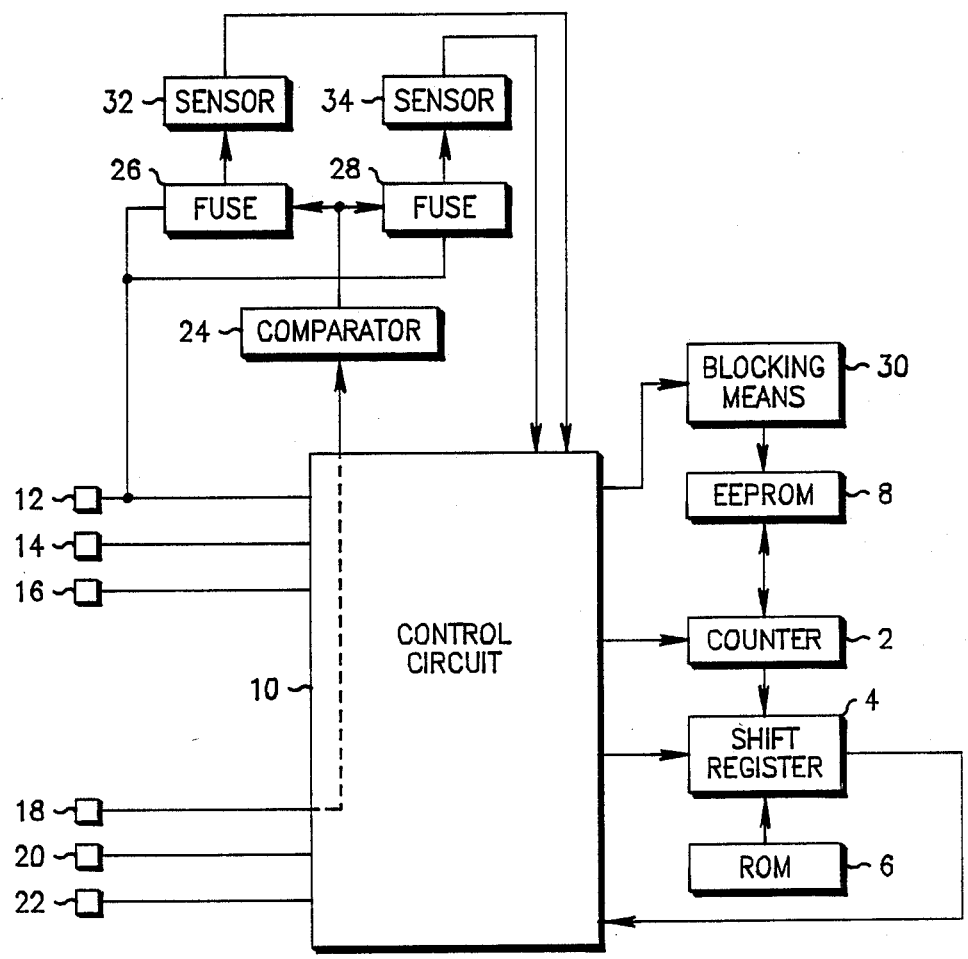
FIG. 1 is a block diagram of part of an integrated circuit for use in debit cards according to the invention.

As shown in FIG. 1 an integrated circuit for a debit card comprises a non-volatile counter, a shift register 4 and a Read Only Memory (ROM) 6, or a Programmable ROM. This ROM 6 is used for the identification of the type of card according to ISO standards. The non-volatile counter is made up of a binary up-counter 2 with no wrap-around and of corresponding Electrically Erasable PROM bits (EPROM) 8. The operation of the EEPROM and of the rest of the circuitry requires some program control circuitry 10. The control circuitry has three supply inputs—a programming voltage input 12, a supply voltage input 14 and a reference voltage input 16. It also has three ports—a data input/output port 18, a clock input 20 and a reset input 22.

Figure 3:
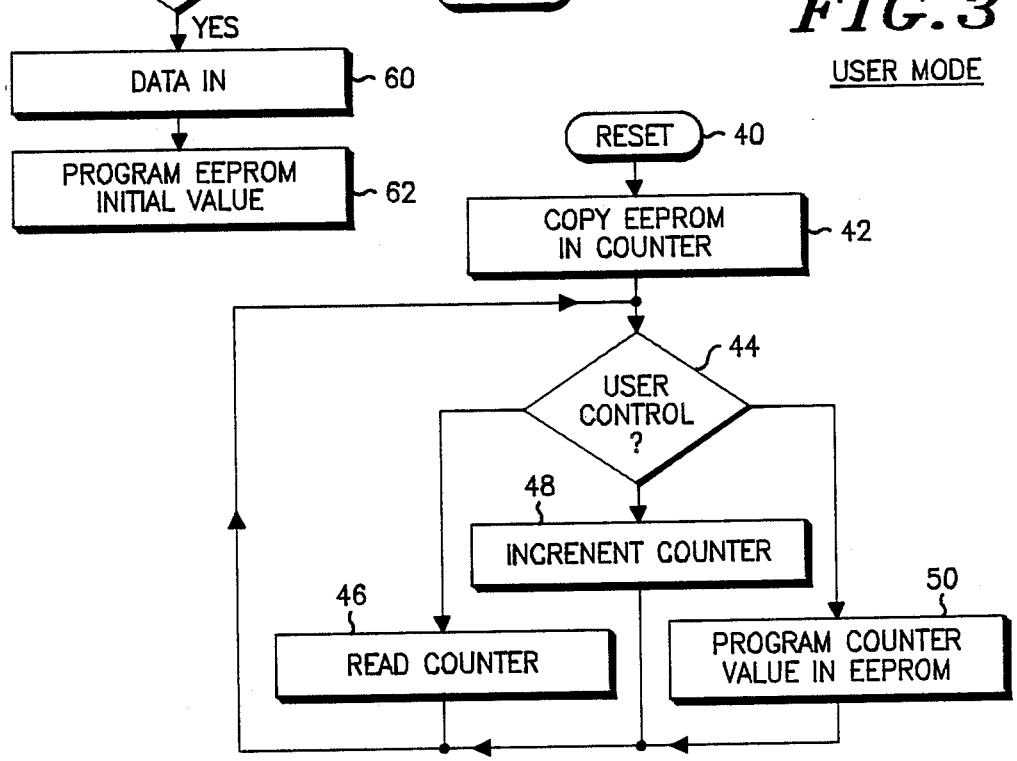
FIG. 3 is a flow diagram for operation of the circuit of FIG. 1 in user mode.

When in normal use by a user called hereinafter "User Mode", the procedure follows the steps shown in the Flow Diagram of FIG. 3. When the card is inserted into a service machine for a transaction, the circuit is powered-up and reset (40). The data stored in the EEPROM 8 is transferred (42) to the counter 2. At this time, also, the data stored in the ROM 6 is transferred to the shift register 4 for checking that the card is valid for the transaction.

Once this check has taken place, the user can control the card (44) to read (46) the value in the counter 2 via the shift register 4 in order to check whether the maximum credit available with the card has yet been reached. If credit is still available, the user may obtain a service at which time the counter 2 is incremented (48), where each incremental bit corresponds to a predetermined monetary value, e.g. one cent. Upon completion of the transaction, the value stored in the counter 2 is programmed (50) into the non-volatile EEPROM before power is switched off and the card is withdrawn. When the card is next used, the counter 2 will be preset with this new value.

As is evident from the above, before a card can be given to a user, it must be initialised by programming the EEPROM with the amount of credit available.

In order to provide security against unauthorised initialisation of cards stolen in the period between manufacture and authorised initialisation, that is, during the storage and transportation period, hereinafter called the transport mode, a security or transport code is preprogrammed into the EEPROM 8. This transport code is not readable to the output port 18 and is deleted during the initialisation phase.

Figure 2:
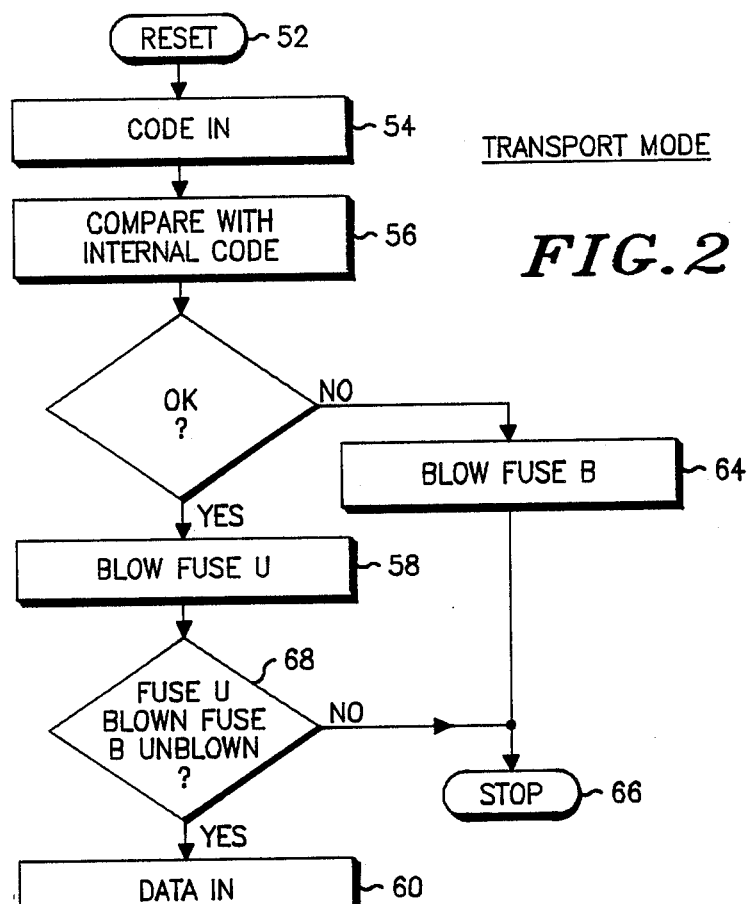
FIG. 2 is a flow diagram for operation of the circuit of FIG. 1 in transport mode.

The procedure to be followed to start the initialisation phase is shown schematically in the flow diagram shown in FIG. 2 of the card in transport mode. After switching the power on and resetting the circuit (52), a code is input (54) to the circuit and compared (56) with the transport cod by a comparator 24. If the two codes match, then an irreversible switch in the form of a fuse 26 coupled to the output of the comparator 24 is blown (58). Sensing means 32 determines whether the fuse 26 is blown or not and passes the result to the control circuitry 10.

If it is found that the fuse 26 has been blown, i.e. that the correct code has been input, the transport code is deleted and new data for initialisation of the card is input (60) and programmed (62) into the EEPROM 8. The card is now in user mode and at the next power-up the operation will follow that shown in FIG. 3.

By using the same memory locations in the EEPROM 8 for both the transport code and, later, for the counter value of the card in user mode, no further memory space is required for the card whilst providing greater security. Thus this double use allows a dense design of the circuit on the semiconductor chip and also prevents the discovery of the transport code once a card has been initialised for public use since it is deleted and overwritten.

It will be apparent that, as described above, if such cards in transport mode are stolen, several attempts at matching the codes could still be undertaken by fraudsters. Threrefore there is provided a second fuse 28, also coupled to the output of the comparator 24, which fuse 28 is blown (64) if the input code and the transport code do not match. In this event, sensing means 24 determine that fuse 28 has been blown and further input and comparison of codes with the stored transport code is blocked by blocking means 30 so that the card is in a block mode.

It is important that the operation of the chip is symmetrical in transport mode whichever one of the two fuses is blown. This is to prevent a fraudster trying to avoid blowing the fuse 28 after a wrong code has been entered by, for example, limiting the current or voltage supplied to the chip when the fuse 28 should be blown. Therefore, both fuses 26 and 28 are identical, requiring the same value current to blow them and are coupled in parallel to the output of the comparator and to the same supply voltage so that it is impossible to change one of the fuse circuit outputs without changing the other, even with variations in the supply voltage. For the same reasons both sensing means 32 and 34 are also identical.

Furthermore, the card is only allowed to go from the transport mode to the user mode if both fuse 26 is blown and fuse 28 is unblown (68). If this is not the case, for example if both fuses are somehow blown, then the card is also put into block mode. Thus the card in transport mode is secure against unauthorized initialisation since only one attempt at inputting a code to match the transport code is allowed.

There have, therefore, been proposed three different operating modes for the card-user mode, transport mode and block mode. In each of these modes various operations are or are not available. In order to test the card during or after manufacture it must be possible to make sure that blowing the particular fuses really will change the mode of the card and allow or inhibit the particular functions associated with the particular mode. Clearly this cannot be tested by actually blowing the fuse as this is irreversible. Therefore a further mode is provided called a test mode separated from the other modes by a further fuse which is blown on completion of the test.

The test mode is provided by a logic circuit which simulates the other modes by latching control and test signals and using them instead of the actual fuse status.

Figure 4:
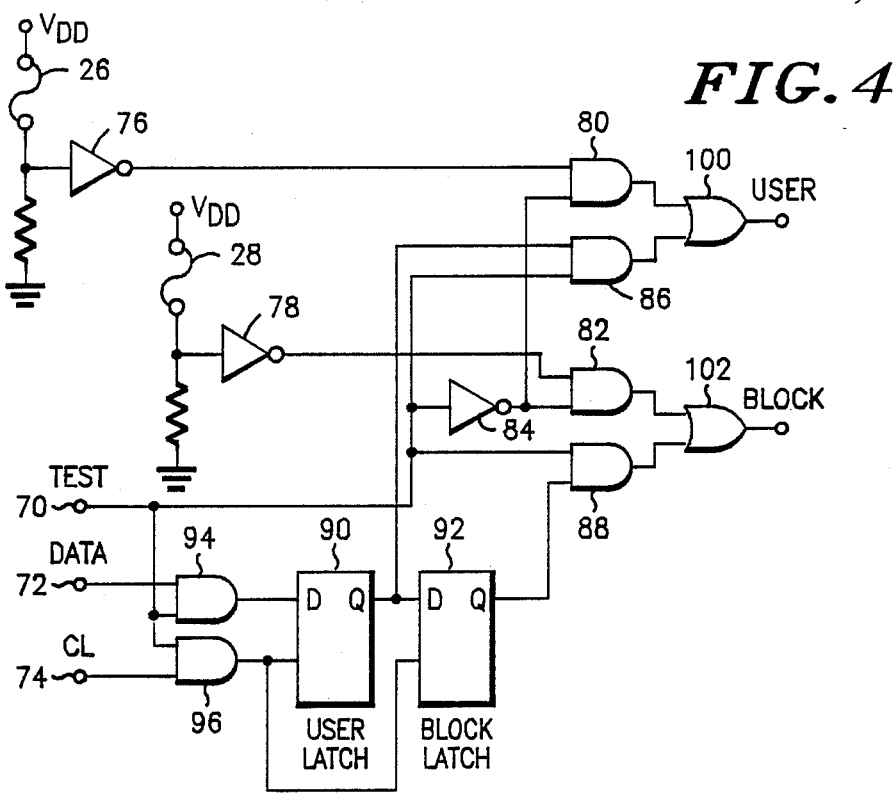
FIG. 4 is one embodiment of a circuit for testing the operation of the circuit of FIG. 1.

FIG. 4 shows one embodiment of such a logic circuit. In this circuit, a test signal is applied to node 70, a data or control signal to node 72 and a clock signal to mode 74. Fuses 26 and 28 are shown coupled between $V_{DD}$ and ground reference. The signals from the fuses 26 and 28 are coupled via respective inverters 76 and 78 to respective AND-gates 80 and 82 whose other inputs are coupled to the test signal from node 70 via an inverter 84. The uninverted test signal from node 70 is coupled to first inputs of respective AND-gates 86 and 88 whose other inputs are coupled respectively to the outputs of latches 90 and 92. The latches are set from the outputs of AND-gates 94 and 96 having as inputs the test and data signals and the test and clock signals respectively, such that one latch 90 simulates the status of fuse 26 and the other latch 92 simulates the status of fuse 28.

By passing the outputs of AND-gates 80, 86, and 82, 88 respectively to OR-gates 100 and 102, the output from the OR-gates depends only on the status of latches 90 and 92, if a test signal is present or only on the status of the fuses 26 and 28, if a test signal is not present. These outputs are then sensed by the respective sensing means 32 and 34. At the end of the test, a fuse (not shown) coupled between node 70 and AND-gate 94 is blown so that no signal is present at AND-gates 86 and 88 so that the output of OR-gates 100 and 102 is solely dependent on the status of the fuses 26 and 28.

Figure 5:
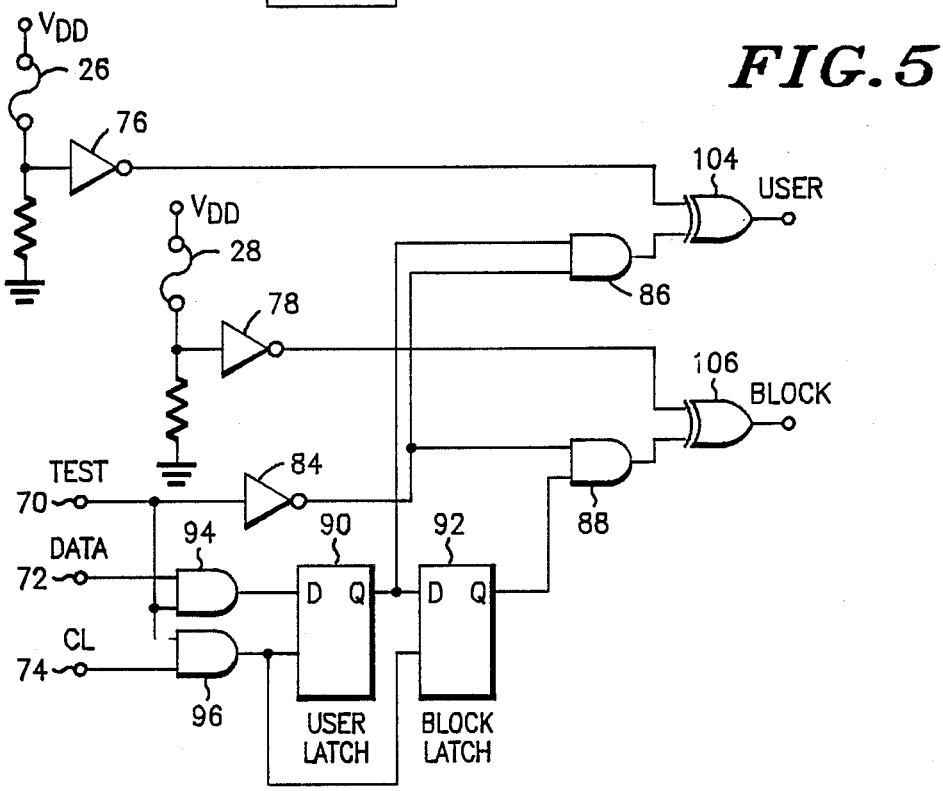
FIG. 5 is a second embodiment of a circuit for testing the operation of the circuit of FIG. 1.

A different embodiment of a suitable logic circuit is shown in FIG. 5 where the AND-gates 80 and 82 and OR-gates 100 and 102 are replaced, for each fuse, by a single EXCLUSIVE OR-gate 104 and 106. All other parts of this circuit are the same as shown in FIG. 4, and the outputs from the EXCLUSIVE OR-gates 104 and 106 are the same as from OR-gates 100 and 102.

It will be apparent that although a serial load of test data to the latches is shown, a parallel load is also possible depending on the availability of circuit inputs. It will also be apparent that although only two embodiments of a logic circuit for simulating the status of the fuses are shown, various other embodiments are also possible.

We claim:

1. A data card of the type comprising an integrated circuit on a semiconductor chip embedded in a plastic card, the circuit including a non-volatile memory having a transport code preprogrmamed therein, control circuitry for controlling the circuit, a comparator having a first input coupled to an input node of the circuit for receiving an externally-applied code and a second input coupled to said memory for comparing said externally-applied and transport codes, and a first irreversible switch coupled to an output of the comparator such that said first irreversible switch is actuated if the externally-applied and transport codes match.

2. A data card according to claim 1 further comprisng first sensing means coupled between said control circuitry and said first switch for sensing whether said first switch has been actuated, whereby the transport code is deleted from the memory and initialisation of the memory is enabled by the control circuitry if the first switch has been actuated.

3. A data card according to claim 2 further comprising blocking means coupled to said control circuitry for preventing the memory from being read or programmed if said first switch has not been actuated.

4. A data card according to claim 2 wherein initiatisation of the memory includes programming an inital value of a counter.

5. A data card according to claim 2 wherein initialisation of the memory includes programming a personal security code into the memory.

6. A data card according to claim 1 wherein said memory is an EEPROM.

7. A data card according to claim 1 further comprising a second irreversible switch coupled to an output of the comparator such that the irreversible switch is actuated if the externally-applied and transport codes do not match.

8. A data card according to claim 7 further comprising second sensing means coupled between said control circuitry and said second switch for sensing whether said second switch has been actuated and disabling means coupled to said control circuitry for disabling the circuit if said second switch has been actuated.

9. A data card according to claim 7 wherein said first and second switches are coupled in parallel to the output of the comparator such that the output of a signal from the comparator causes either the first or the second switch to be actuated.

10. A data card according to claim 1 wherein said first irreversible switch is a fuse.

11. A data card according to claim 6 wherein said second irreversible switch is a fuse.

12. A data card according to claim 10 wherein said first and second irreversible switch are fuses having the same sensitivity such that the same current is required to blow either fuse.

13. A data card according to claim 1 further comprising test means for simulating the status of a said irreversible switch whereby said circuit may be tested without activating said irreversible switch.

14. A data card according to claim 13 wherein said test means comprises a logic circuit and is enabled by a test signal.

15. A data card according to claim 14 wherein said test means comprises a latch having an output coupled to a first input of an AND-gate, a second input of the AND gate being coupled to receive the test signal, and an EXCLUSIVE OR-gate having a first input coupled to the output of said AND-gate, a second input coupled to said irreversible switch.

16. A data card according to claim 14 wherein said test means comprises a latch having an output coupled to a first input of a first AND-gate, a second input of the first AND-gate geing coupled to receive the test signal, a second AND-gate having a first input coupled to said irreversible switch, a second input coupled to receive the test signal via an inverter, and an OR-gate coupled to receive at its inputs, outputs from the two AND-gates.

17. A data card according to claim 14 comprising first and second said test means for simulating the status of first and second irreversible switches respectively.

18. A data card according to claim 13 wherein said test means includes a third irreversible switch which is actuated on completion of the test.

19. A data card according to claim 18 wherein said third irreversible switch is a fuse.

* * * * *

UNITED STATES PATENT AND TRADEMARK OFFICE
CERTIFICATE OF CORRECTION

PATENT NO. : 4,841,133

DATED : June 20, 1989

INVENTOR(S) : Anil Gercekci et al

It is certified that error appears in the above-identified patent and that said Letters Patent is hereby corrected as shown below:

Column 6, claim 12, line 19, delete "switch" and insert therefor --switches--.

Column 6, claim 16, line 39, delete "geing" and insert therefor --being--.

Signed and Sealed this

Sixth Day of March, 1990

Attest:

JEFFREY M. SAMUELS

*Attesting Officer*    *Acting Commissioner of Patents and Trademarks*